United States Patent Office 3,496,070
Patented Feb. 17, 1970

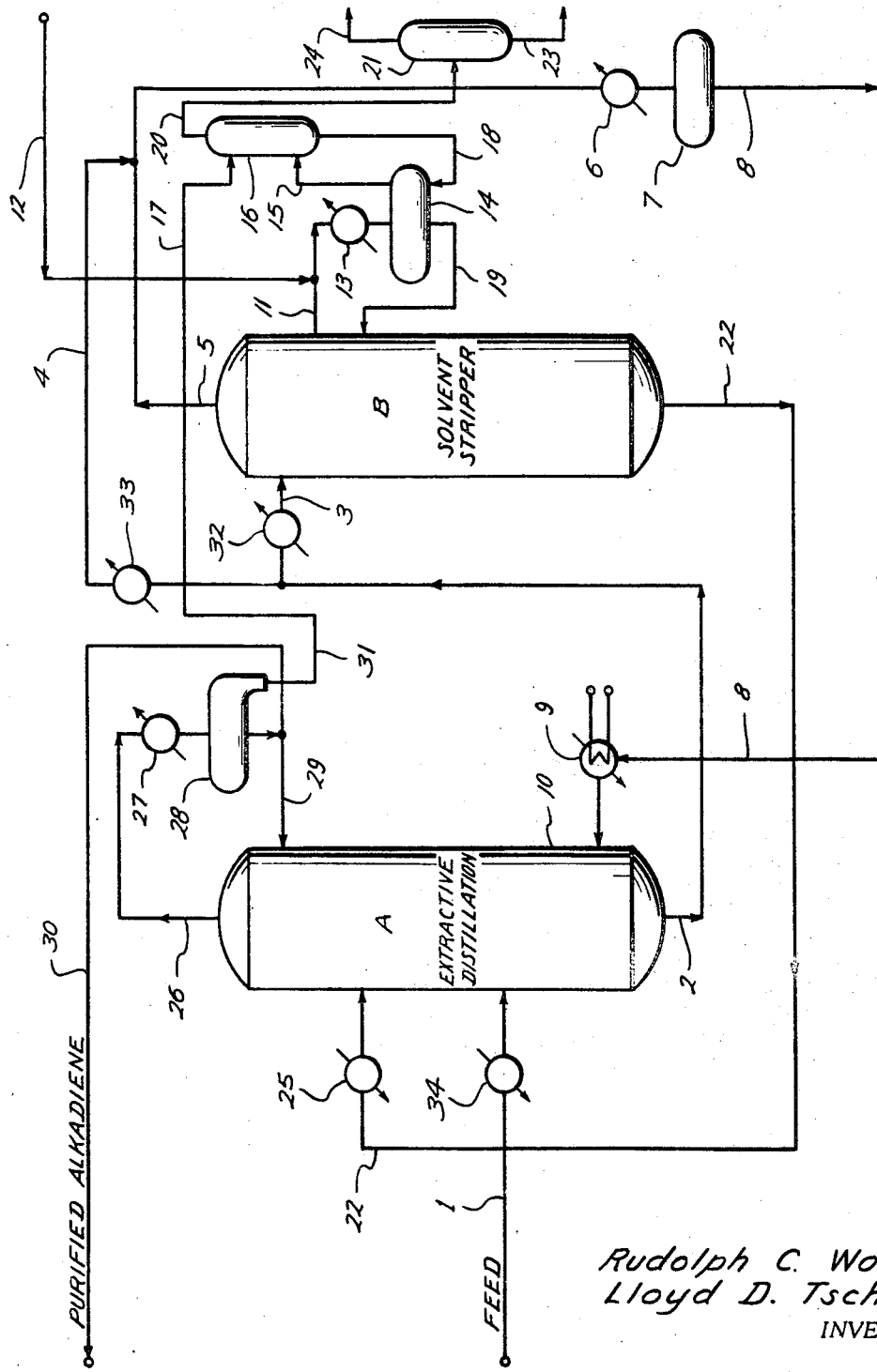

3,496,070
PURIFICATION OF UNSATURATED HYDROCARBONS BY EXTRACTIVE DISTILLATION WITH ADDITION OF LIQUID SOLVENT TO STRIPPER OVERHEAD
Rudolph C. Woerner, Houston, and Lloyd C. Tschopp, Humble, Tex., assignors to Petro-Tex Chemical Corporation, Houston, Tex., a corporation of Delaware
Filed Nov. 9, 1967, Ser. No. 681,609
Int. Cl. C07c 7/08, 11/12; B01d 3/34
U.S. Cl. 203—62          9 Claims

ABSTRACT OF THE DISCLOSURE

Separation of hydrocarbons of 4 to 5 carbon atoms including unsaturated hydrocarbons by a process comprising extractive distillation. Liquid solvent is fed to the vaporous overhead from the stripper prior to or during condensation of the stripper overhead to lower the pressure in the overhead condenser and in the stripper.

BACKGROUND OF THE INVENTION

Field of the invention

This application relates to the separation of hydrocarbons of 4 to 5 carbon atoms including unsaturated hydrocarbons utilizing an improved method of extractive distillation.

Description of the prior art

Unsaturated hydrocarbons of 4 to 5 carbon atoms are prepared commercially by dehydrogenation of more saturated hydrocarbons such as alkanes or alkenes. These processes provide a mixture of hydrocarbons containing various degrees of unsaturation. For instance, butene or butane or mixtures thereof may be dehydrogenated to produce a hydrocarbon mixture containing some unreacted feed, butene, butadiene and a minor amount of alkynes such as vinyl acetylene. Similar mixtures may result from reactions other than dehydrogenation processes such as the cracking of hydrocarbons. Generally, the separation of these mixtures cannot be economically performed by fractional distillation alone. It has been conventional to employ extractive distillation to separate hydrocarbons having narrowly separated boiling points or hydrocarbons forming azeotropes during distillation. Example of extractive distillation processes may be found, e.g., in Tschopp, U.S. 3,000,794, Sept. 19, 1961, and King et al., U.S. 3,317,627.

Even though extractive distillation is employed to separate hydrocarbons which are difficult to separate, there are still some drawbacks in prior art processes. A continuing object in this field has been to reduce the content of alkynes, especially when the desired product is an alkadiene. A further problem in prior art processes is that undesirable reactions occur during the overall process of extractive distillation and stripping. This is particularly true where alkadienes or alkynes are present, as polymerization of these compounds or reactions with the solvent are likely to occur. It is one of the principal objects of this invention to provide a process whereby there is reduced polymerization and fouling during the extractive distillation and stripping operations. Other objects of this invention include the provision of a process to provide high purity alkadiene containing minimum amounts of alkyne with a minimum loss of alkadiene. Another object is to provide a process which has reduced maintenance costs and reduced loss of solvent at a result of lower rates of reaction of alkadiene or alkyne with other components. Still another object is to provide a process which is more economical to operate especially due to reduced costs of utilities.

Summary of the invention

According to this invention, a hydrocarbon separation process is provided for the separation of a hydrocarbon mixture comprising 4 to 5 carbon atoms including unsaturated hydrocarbons which comprises extractively distilling the hydrocarbon mixture with a selective solvent in an extractive distillation column whereby hydrocarbon is selectively extracted in the extractive distillation column to form a hydrocarbon-rich solvent fraction which is fed to a solvent stripping column with said solvent being taken off as a bottoms from said stripping column and a vaporous hydrocarbon fraction being taken as an overhead fraction from said stripping column, adding said selective solvent in liquid phase to the vaporous overhead from the solvent stripper to lower the pressure in the overhead condenser of the solvent stripper column and in the solvent stripper.

Brief description of the drawing

One preferred method of conducting the process of this invention is illustrated in the drawing. An organic feed 1 comprising a hydrocarbon mixture containing $C_4$ or $C_5$ alkadiene contaminated with a minor portion of alkyne is fed to extractive distillation zone A. A solvent which dissolves both alkadiene and alkyne and which preferentially dissolves alkyne is fed to zone A as solvent stream 22. A rich solvent stream 3 is fed to a solvent stripping zone B and lean solvent 22 is returned to zone A. Liquid solvent is fed to the overhead 5 from the solvent stripper by feeding a portion of the rich solvent stream as stream 4 to the overhead 5. The pressure in the solvent stripper is reduced as a result of feeding stream 4. The overhead 5 from zone B is cooled and condensed in condenser 6 and accumulated in accumulator 7. Optionally liquid phase hydrocarbon 8 may be fed to a reboiler 9 and into the lower portion of zone A. High purity alkadiene containing substantially reduced alkyne content is taken as product 30. Stream 11 is taken from solvent stripper B at a point below entry of stream 3, cooled in partial condenser 13 and accumulated at 14 and partially recycled as stream 19. The stream 20 containing a high concentration of alkyne may then be separated in separator 21 to produce an alkyne product 23 and an alkadiene product 24.

Description of the preferred embodiment(s)

According to this invention, it has been found that the objects of this invention may be accomplished by feeding a portion of the selective solvent used in the extractive distillation column in liquid phase to the vaporous overhead from the solvent stripper prior to or during condensation of the stripper overhead. By combining the liquid solvent with the vaporous overhead, the vapor pressure in the condenser used to condense the stripper overhead is lowered and also the pressure in the stripper column is lowered. Because the pressure in the stripper column is lowered, the maximum temperature required in the stripper is lowered. By lowering the temperature and pressure in the stripper, the undesired reactions of unsaturated hydrocarbon to form polymer or to react with the solvent are minimized. Furthermore, the heat input requirement to the stripper is reduced. The solvent added to the overhead from the stripper is roughly of the same type as that utilized in the extractive distillation column. Of course, the concentrations may be varied somewhat such as the percentage of water present, if water is utilized, but the same type of solvent is employed. By so doing, the over-all system is not diluted with a foreign component. The solvent added to the overhead from the solvent stripper is miscible with the hydrocarbon being stripped in the stripper.

In order that those skilled in the art may more fully appreciate the nature of the invention and a method for carrying it out, it will be more specifically described in connection with the accompanying drawing which is a flow sheet of one form of the invention. The process will be illustrated by the use of particular pieces of equipment, but it is understood that alternate equipment may be employed. Conventional auxiliary equipment such as pumps, additional heating and cooling means, compressors, etc. have not been shown as this type of equipment is well known to those skilled in the art.

One method of carrying out the invention is illustrated in the drawing. The feed 1 to the extractive distillation zone A comprises unsaturated hydrocarbons of 4 to 5 carbon atoms such as alkadienes contaminated with minor amounts of alkyne of the same number of carbon atoms, a mixture of alkenes and alkadienes or alkenes, alkadienes and alkynes. Also present may be other hydrocarbons such as alkanes generally in minor amounts. Thus, the alkadiene may be butadiene-1,3 contaminated with vinyl acetylene or may be isoprene contaminated with such as isopropyl or isopropenyl acetylene and perhaps 1-pentyne or 2-pentyne. Similarly, the feed might be butene-1 containing a minor amount of butadiene-1,3. This feed stream will normally be a hydrocarbon stream and may contain other components such as hydrocarbons of 2 to 8 carbon atoms. Preferably, the major hydrocarbon component will be alkadiene of 4 to 5 carbon atoms, with alkyne present in an amount of less than 5 liquid volume percent based on the volume of 4 to 5 carbon alkadienes. This stream 1 may also contain solvent which is employed in the extractive distillation zone A. Also, a composition containing solvent may be taken from the extractive distillation zone A such as from the lower half of the column and mixed with feed 1 prior to entry to the extractive distillation zone. The extractive distillation zone A may be any conventional equipment such as a plate or packed type column. The bottoms 2 contains solvent together with unsaturated hydrocarbon dissolved therein. This rich solvent is fed to the solvent stripping zone B as stream 3 after cooling in cooler 32. The solvent stripping zone B may be conventional equipment such as a plate type stripper. Preferably stream 3 is introduced into the solvent stripper at a point where the temperature is lower than the point at which stream 11 is taken from the solvent stripper. That is, in a column-type stripper stream 3 will be added at a point higher than the point of withdrawal of stream 11. A portion of this bottoms 2 is fed as a liquid stream 4 and mixed with the vaporous overhead 5 from the solvent stripper. By so doing liquid solvent is mixed with the vaporous overhead from the solvent stripper according to this invention. This solvent for stream 4 may be wholly or partially supplied from another source. The overhead 5 is cooled and condensed in condenser-cooler 6 and accumulated in accumulator 7. This liquified overhead stream 8 is then fed to reboiler 9 and into the lower portion of the exrtactive distillation zone A. This feature of feeding material back to the extractive distillation column is claimed in our copending application Ser. No. 681,613 filed on even date herewith. The reboiler 9 may be separate from or an integral part of the extractive distillation zone A. In the reboiler stream 8 is partly vaporized and the composition is allowed to pass upward as a vapor through extractive distillation zone A. Stream 8 contains a high concentration of alkadiene and a reduced concentration of alkyne as compared with feed 1. If desired, this stream may also contain solvent used in the extractive distillatiton zone. Extractive distillation zone overhead 26 is condensed at 27, accumulated at 28, and normally a portion is recycled as stream 29. High purity alkadiene is obtained as stream 30. Stream 30 is substantially reduced in alkynes of 4 to 5 carbon atoms (such as vinyl acetylene when the product is butadiene-1,3 or isopropenyl acetylene,

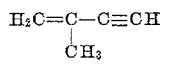

and isopropyl acetylene,

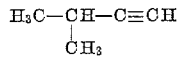

if the product is isoprene) as compared to the feed 1. At least 50 mol percent of these 4 to 5 carbon alkynes may be removed from stream 1 by the process of this invention and ordinarily in excess of 90 or 95 mol percent can be separated. The content of 4 to 5 carbon alkynes in stream 30 will be dependent somewhat on the content of feed 1 but under normal conditions the stream can easily be controlled to contain less than 400 parts per million by liquid volume percent of the alkynes selected from the group consisting of vinyl acetylene, isopropyl acetylene, isopropenyl acetylene or mixtures thereof based on the alkadiene and much lower concentrations such as less than 250 or 200 parts per million. Of course, the final alkadiene product may contain substantially less alkynes than in stream 30 as further purification of this stream may be accomplished downstream such as by fractionation. Stream 22 contains stripped or lean solvent and is returned to extractive distillation zone A suitably through a cooler 25.

In this example stream 11 contains a high concentration of alkyne and is taken at a point below the entry point of stream 3. Stream 11 may also be taken as a bottoms from solvent stripper B in which case provision must be made for separation of hydrocarbons from solvent according to this invention; however, this stream is preferably taken from the upper two-thirds of the solvent stripper. Stream 12 which shows the addition of an inert diluent to stream 11 prior to cooling and condensation. This is an optional feature. Stream 12 may be such as natural gas or any other suitable diluent which will dilute the concentration of alkyne in liquid phase. Stream 11 is cooled and partially condensed at 13 and accumulated in accumulator 14. Normally a portion of this accumulated mixture will be recycled as stream 19 to the solvent stripper. The composition in accumulator 14 will contain solvent, including water if water is also employed as part of the solvent, alkyne and generally some alkadiene. The uncondensed fraction from the accumulator 14 may be suitably fed as stream 15 to solvent absorber 16 for washing the composition to separate solvent from hydrocarbon. The solvent absorber 16 may be any apparatus for liquid-gas contacting such as a packed or plate column. However, if a condenser is not employed to condense stream 11, this stream 11 could be fed directly to the solvent absorber 16 where some condensation might take place.

Another optional feature of this invention constitutes the use of the accumulated water from accumulator 28 which is fed as stream 31 to the solvent absorber. By so using the water accumulated in 28, the water balance in the system is maintained at more nearly equilibrium, and it is not necessary to remove water from the system to prevent water build-up. However, water from any other source may be used as water stream 31. The hydrocarbon stream 20 contains alkyne and usually alkadiene. This stream may also contain inert diluent 12. If desired, this hydrocarbon stream may be separated by any means shown as 21 to recover alkyne such as by fractionation or refrigeration and fractionation to separate an alkyne stream 23 and an alkadiene stream 24, or alternately stream 20 may be hydrogenated to convert the alkyne to an alkene and alkadiene mixture. This stream may also be returned as a feed to a dehydrogenation reactor. Preferred as step 21 is a fractionating column especially when the alkadiene is butadiene-1,3. At this point the interfering alkenes preferably have been essentially removed. The same is true of any alkanes that might have been present. Hence, there is an improvement for the straight fractionation of $C_4$ hydrocarbons. In the case of butadiene-1,3 and vinyl acetylenes the butadiene-1,3 would come off overhead as stream 24 and vinyl acetylenes would be stream 23.

Alternate methods of operation and separation may be employed. It is not essential that the overhead product from the solvent stripper be recycled to the extractive distillation column as shown by stream 8 of the drawing. Thus, the product of the process may be taken as an overhead from the solvent stripper instead of from the extractive distillation column. For example, the mixture of alkane, alkene, alkadiene and alkyne may be separated by feeding the mixture to an extractive distillation column wherein undissolved alkane and alkene are taken overhead from the extractive distillation column and the alkadiene and alkyne are selectively extracted. This rich solvent is then fed to the solvent stripper with a vaporous overhead of alkadiene taken from the stripper and a sidestream concentrated with alkynes is taken from the stripper. Liquid phase solvent is added to the vaporous overhead from the solvent stripper either prior to or during condensation in the stripper condenser. The source of the solvent may be either by feeding a portion of the hydrocarbon-rich solvent from the extractive distillation column or may be fed as fresh solvent. The condensed overhead from the stripper will then contain alkadiene and the added solvent. This solvent may be separated from the alkadiene in any convenient manner, such as by washing with water or by stripping in a smaller, secondary stripper. Because of the reduced size, the secondary stripper may be economically refrigerated to prevent polymerization or fouling. Similarly, the process of this invention may be utilized to separate two component mixtures with the undissolved composition taken overhead from the extractive distillation column and the selectively dissolved unsaturated hydrocarbons taken overhead from the solvent stripper. Here again, the overhead from the solvent stripper would contain the added solvent and the solvent could be separated as mentioned. Instead of separating, a minor portion of alkyne from alkadiene as illustrated in the drawing, it is feasible to separate a minor portion of alkadiene from alkenes in like manner manner with the alkadiene being extracted in the solvent. Also, three components may be separated by taking overhead an unextracted fraction such as alkanes from the extractive distillation column and proceeding to separate the remaining components. At any rate, in all these instances, the pressure and temperature of the solvent stripper is lower than it would have been if the liquid solvent were not added to the vaporous overhead from the solvent stripper according to this invention. Generally, the pressure in the solvent stripper will be at least 5 p.s.i.g. lower, and preferably at least 15 p.s.i.g. lower than it would have been if the solvent were not added to the overhead from the stripper. Correspondingly, the maximum temperature in the solvent stripper will generally be at least 6° F. lower, and preferably at least 17° F. lower than the temperature would have been if the solvent were not added to the overhead from the solvent stripper. This invention is most preferably applied to the separation of $C_4$ hydrocarbons which generally will contain butadiene-1,3.

According to this invention, the pressure in the solvent stripper is maintained at a lower level than ordinarily would be present in the solvent stripper utilizing any particular solvent. Consequently, a lower temperature is also maintained in the stripper. This lower temperature and pressure retards the formation of alkyne or alkadiene polymers or reaction products with alkyne or with other components such as solvent, etc.

The extractive distillation zone employed may be any type column or units known to those skilled in the art to be useful in extractive distillation processes. Such columns may include trays or packing, and the like. The size of the column, of course, will depend upon the flow rates required and the degree of alkyne extraction desired or required. As a preferred embodiment, the maximum temperature in the extractive distillation column can be maintained at a temperature of no greater than 300° F. and may be no greater than 275° F.

The solvents employed in the extractive distillation zone may include any of the polar solvents known to selectively separate alkynes from alkadienes such as acetone, acetonitrile, beta, beta-dichloroethyl ether, dimethylacetamide, dimethylformamide, dimethylsulfoxide, dioxane, furfural, methyl ethyl ketone, N-methylpyrrolidone, phenol, mixtures of these solvents with one another or with water, and the like. Normally, any of the polar solvents or mixtures thereof which are ordinarily employed in extractive distillation of hydrocarbons such as alkadienes may be used. Use of any of the known polar solvents containing small amounts of water, as about 1 to about 25 percent is applicable. A preferred solvent is furfural containing from 1 to 25 percent by weight of water.

The solvent stripper zone according to this invention is operated at a relatively low temperature and pressure and preferably will be at a lower pressure than the extractive distillation zone. The pressure in the solvent stripper will preferably be less than 75 p.s.i.g. and suitably may be 50 p.s.i.g. or less. The stripper may be such as a plate type or packed column and may be any acceptable equipment for stripping off hydrocarbons as an overhead leaving solvent perhaps with more unsaturated hydrocarbons dissolved therein, depending upon the particular separation being made. Desirably, the zone will contain a substantial quantity of water if an alkyne is being separated in order to lower the concentration of alkyne. The process is less hazardous if any alkyne being withdrawn is at least 75 mol percent (and preferably essentially all) in vapor phase at the point of withdrawal. Solvent stream 22 may if desired be mixed with the overhead from the solvent stripper, that is, partly or completely used instead of any stream 4.

A specific example of the invention will now be illustrated. Reference is made to the drawing. All percentages are liquid volume percentages unless stated otherwise. Certain conventional equipment and means have not been shown as these are well known to those skilled in the art. The extractive distillation zone A is illustrated as an extractive distillation column with bubble cap plates. Hydrocarbon feed 1 is fed to the column A in an amount of about 102 barrels per hour constituting 87.62 percent butadiene-1,3, 11.87 percent butylene-2, 0.41 percent vinyl acetylene, and a minor amount of water. The composition as it enters the column A may also suitably be mixed with recycled composition taken from column A with the net feed consequently containing considerable solvent. This reflux step is not shown on the drawing. The feed is heated in heater 34 prior to entry to maintain the conditions in column A. The solvent 22 fed to the column contains 8 percent water and 92 percent furfural and is fed at a rate of 564 barrels per hour. The overhead 26 from the column is at a pressure of 54 p.s.i.g. and a temperature of 110° F. The flow rate of stream 26 is 473 thousand standard [1] cubic feet per hour. The feed as it enters the column is at a temperature of 144° F. The maximum temperature in the column is 230° F. and at a pressure of 62.4 p.s.i.g. The bottoms 2 from column A contains 8.35 percent butadiene-1,3, 0.77 percent butylene-2, 0.37 percent vinylacetylene, 7.78 percent water and 82.73 percent furfural. This stream is cooled in cooler 32 and fed as stream 3 to the solvent stripper B at a rate of 630 barrels per hour and at a temperature of 161° F. This stream 3 is fed to the upper tray of the solvent stripper which is a plate type column. A portion of the liquid bottoms 2 is combined as stream 4 with the overhead 5 from the solvent stripper suitably after cooling in cooler 33. The overhead 5 is at a tem- ---
[1] Calculated at 60° F. and 14.7 p.s.i.a.

perature of 210° F. and a pressure of 29.5 p.s.i.g. The flow rate of this stream 5 is 144 thousand standard cubic feet per hour. This stream 5 is mixed with stream 4 and cooled and condensed in condenser 6. The overhead accumulator 7 is used to receive the overhead condensate. The composition 8 contains 26.92 percent butadiene-1,3, 2.49 percent butene-2, 0.95 percent vinyl acetylene, 2.48 percent water and 67.16 percent furfural. Recycling the contents of accumulator 7 may also be provided. Stream 8 is fed to a reboiler 9 and thereafter to the bottoms 10 of column A. Heat is provided in reboiler 9 such that the temperature in the bottoms of column A is 230° F. at 62.4 p.s.i.g. The reboiler 9 may be an integral part of column A.

Stream 11 is a vapor stream and is taken from column B from tray 12 of a 50 tray column at a rate of 5260 pounds per hour. Stream 11 contains 4.78 percent butadiene, 0.11 percent butene-2, 4.54 percent vinyl acetylene, 53.69 percent water and 36.88 percent furfural. This stream is cooled in and partially condensed in 13 and the condensate is received in accumulator 14. Stream 19 is recycled to column B with the rate of this recycled stream being 14.13 barrels (calculated at 60° F.) per hour. Stream 12 is natural gas which is mixed with stream 11 prior to condensation. Stream 15 is a vapor stream containing 42.33 percent methane, 27.50 percent butadiene, 0.67 percent butene-2, 24.69 percent vinyl acetylene, 3.03 percent water and 1.77 percent furfural. Item 16 is a solvent absorber. The solvent is washed with water from stream 17. Stream 17 is taken from the extractive distillation column accumulator 28, and consists of the relatively small amount of water which has distilled overhead from column A and collected in accumulator 28 as a liquid phase. A furfural and water stream 18 is recycled to the accumulator 14. The vapor stream 20 contains 43.54 percent methane, 28.33 percent butadiene, 0.63 percent butene-2, 25.42 percent vinylacetylene and 2.08 percent water. This stream may be disposed of in any manner but both butadiene-1,3 and vinyl acetylene may be recovered as products from this stream such as by refrigeration and separation means shown as 21. Vinyl acetylene 23 and butadiene 24 products are so obtained.

The overhead 26 from column A is at a temperature of 110° F. at a pressure of 54.4 p.s.i.g. The flow rate of stream 26 is 473 thousand standard cubic feet per hour. This composition is cooled and condensed in cooler 27 and accumulated in accumulator 28. Recycled stream 29 is fed to the top of column A at a rate of 130 barrels per hour. Stream 30 is the purified butadiene-1,3 product containing 87.93 percent butadiene, 11.96 percent butene-2, 110 parts per million vinyl acetylene by liquid volume and 0.102 percent water. This stream may be fractionated to separate butadiene-1,3 from butene-2 if desired.

Although the invention has been illustrated for the separation of vinyl acetylene from butadiene-1,3 similar results may be obtained for the separation of $C_5$ acetylene compounds from isoprene or for the separation of e.g. butadiene-1,3 from monoolefins and like separations.

We claim:
1. The process for the separation of hydrocarbons of 4 to 5 carbon atoms including unsaturated hydrocarbons which comprises extractively distilling the hydrocarbon mixture with a selective solvent in an extractive distillation column whereby unsaturated hydrocarbon is selectively extracted in the extractive distillation column to form a liquid hydrocarbon-rich solvent fraction which is fed to a solvent stripping column with said solvent being taken off from said stripping column and a vaporous hydrocarbon fraction being taken as an overhead fraction from said stripping column, adding said selective solvent in liquid phase to the vaporous overhead from the solvent stripping column to lower the pressure in the overhead condenser of the solvent stripping column and to lower the pressure in the solvent stripping column.

2. The process of claim 1 wherein the said separation is the separation of a minor amount of vinyl acetylene from butadiene-1,3.

3. The process of claim 1 wherein the said separation is the separation of a minor amount of butadiene-1,3 from less unsaturated $C_4$ hydrocarbons.

4. The process of claim 1 wherein monoolefins are taken overhead from the extractive distillation column, butadiene-1,3 is taken overhead from the solvent stripper column and vinyl acetylene is taken as a side-stream from the solvent stripper column.

5. The process of claim 2 wherein the said vinyl acetylene is taken as a side stream from the said solvent stripping column.

6. The process of claim 1 wherein the said solvent in liquid phase being fed to the vaporous overhead from the solvent stripping column is at least partially supplied by feeding to the vaporous overhead a portion of the said hydrocarbon-rich solvent fraction being fed to the solvent stripping column.

7. The process of claim 1 wherein the said solvent comprises furfural.

8. The process of claim 1 wherein the pressure in the solvent stripper column is lower than the pressure in the extractive distillation column.

9. The process for producing butadiene-1,3 low in vinyl acetylene from a hydrocarbon mixture comprising butadiene-1,3 contaminated with minor amounts of vinyl acetylene which comprises extractively distilling the hydrocarbon mixture in an extractive distillation column whereby vinyl acetylene is selectively extracted in the extractive distillation column to form a liquid vinyl acetylene rich solvent fraction which is fed to a solvent stripping column with said solvent being taken off as a bottoms from said solvent stripping column and a vaporous hydrocarbon fraction being taken as an overhead fraction from the solvent stripping column, adding said selective solvent in liquid phase to the said vaporous hydrocarbon fraction from the stripper to lower the pressure in the overhead condenser of the solvent stripper column, taking purified butadiene-1,3 product from the overhead of the extractive distillation column and separating solvent from a mixture of vinyl acetylene and solvents taken from the solvent stripper column, the pressure of the solvent stripper being lower than the pressure of the extractive distillation column.

References Cited

UNITED STATES PATENTS

| | | | |
|---|---|---|---|
| 3,050,448 | 8/1962 | Fenske et al. | 203—50 |
| 3,320,138 | 5/1967 | Brandt et al. | 203—58 |
| 3,436,436 | 4/1969 | Takao et al. | 260—681.5 |
| 3,436,438 | 4/1969 | Takao et al. | 260—681.5 |
| 3,000,794 | 9/1961 | Tschopp | 260—681.5 X |
| 3,317,627 | 5/1967 | King et al. | 260—681.5 |

PAUL M. COUGHLAN, Jr., Primary Examiner

G. E. SCHMITKONS, Assistant Examiner

U.S. Cl. X.R.

203—53, 54, 57, 58, 50, 60, 63, 65, 78; 260—677, 681.5